Patented Mar. 10, 1953

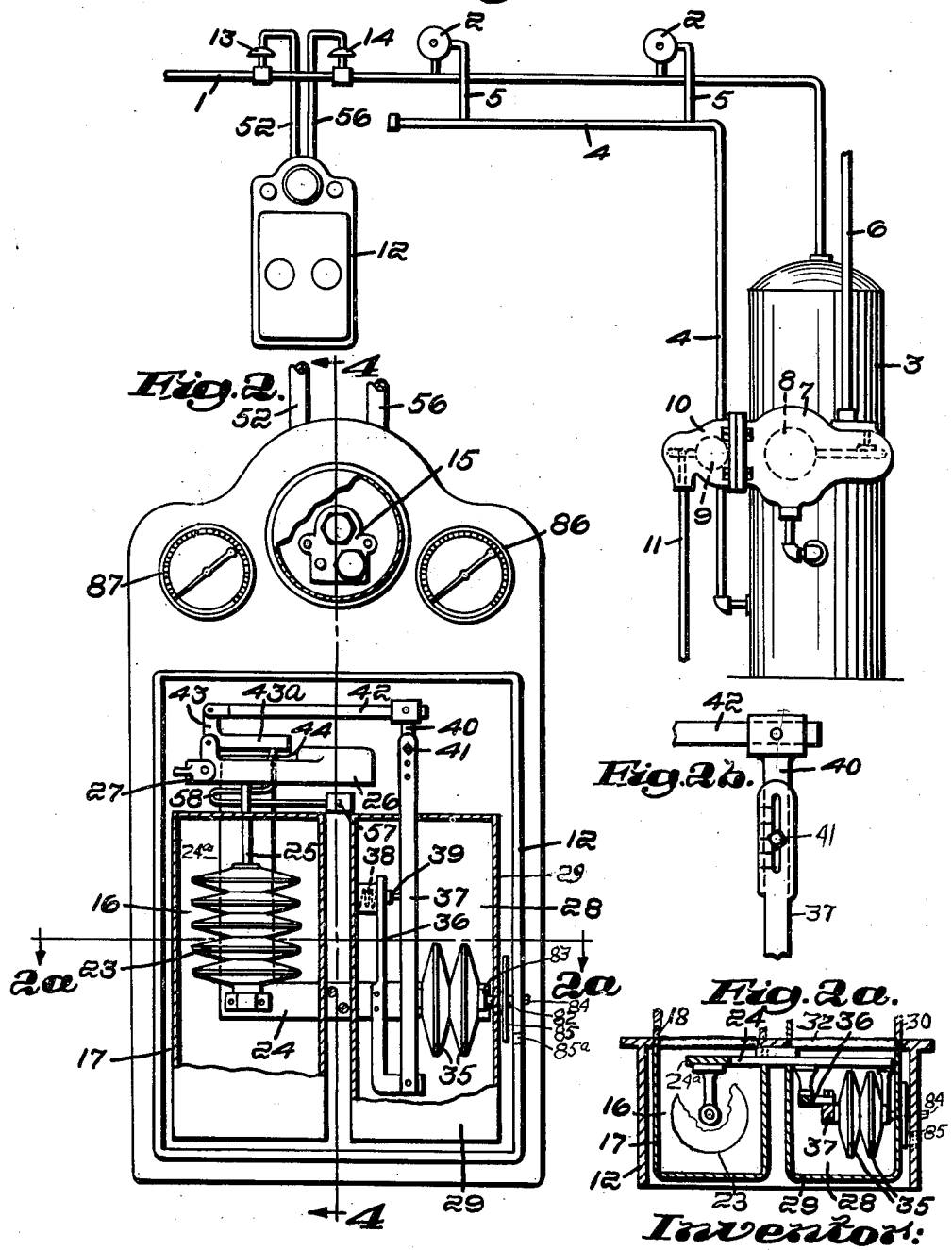

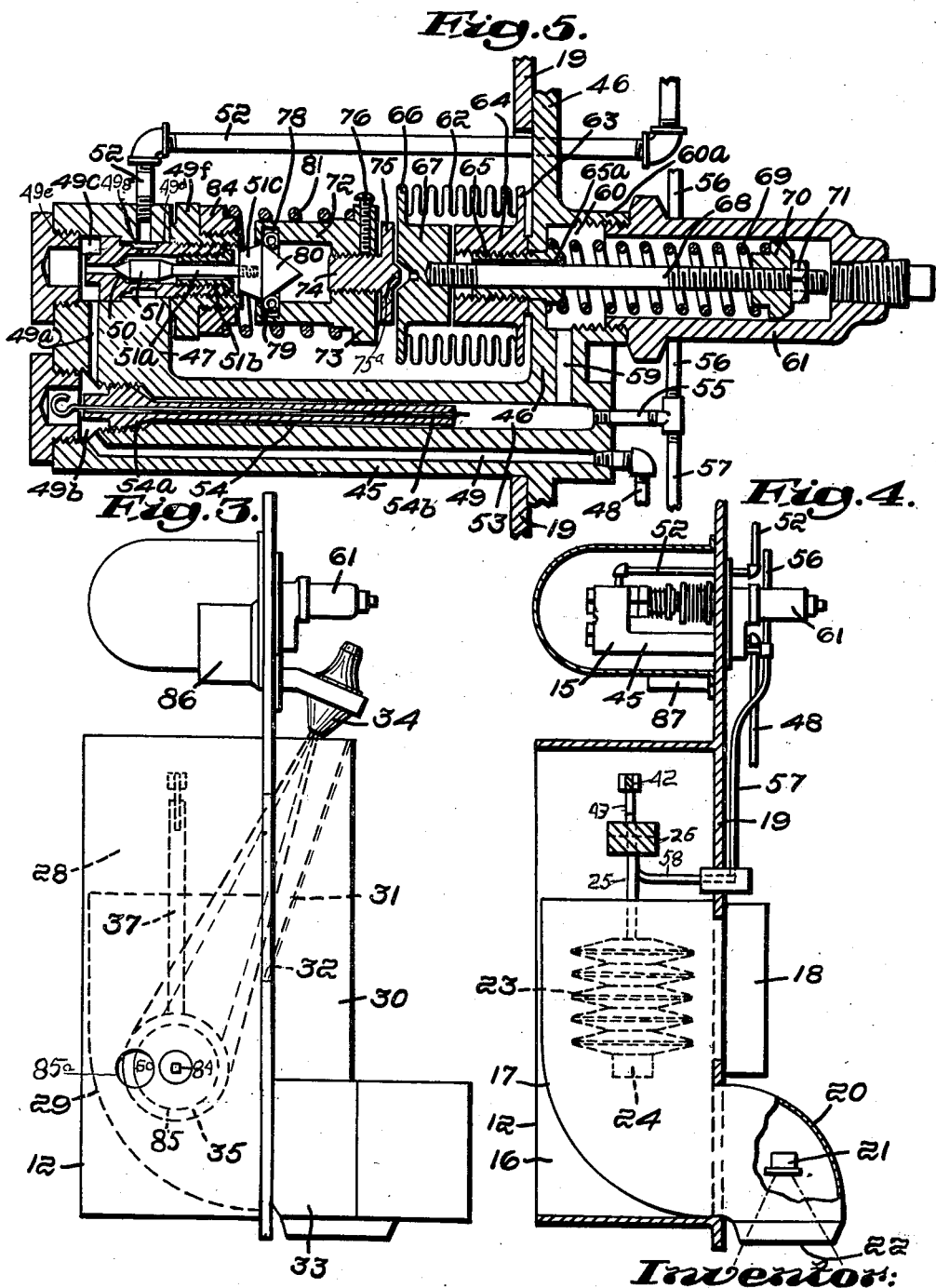

2,630,972

UNITED STATES PATENT OFFICE 2,630,972

HUMIDIFYING SYSTEM AND APPARATUS

Grover B. Holtzclaw, Charlotte, N. C., assignor to Parks-Cramer Company, Fitchburg, Mass., a corporation of Massachusetts Application February 1, 1949, Serial No. 73,910

8 Claims. (Cl. 236—44)

This invention relates to improvements in system and apparatus for humidifying the atmosphere of a room or other enclosure by atomization of water within the enclosure.

Usual systems for conditioning the air of an enclosure by vaporization of water therein comprise installing a number of vaporizing units such as atomizers suitably distributed throughout the enclosure and turning on the units at full capacity until the humidity of the atmosphere of the enclosure reaches a predetermined point, then turning them full off until the humidity of the atmosphere is reduced by liberation of heat in the enclosure, or otherwise, to a predetermined lesser condition of humidity. This has caused uneven conditions as the atmosphere would be alternately over humidified and under-humidified.

Various control means have been tried for lessening the extent of such irregularities in the humidifying cycle, such as the graduated and multi-step control devices outlines by Karlson in Patent No. 1,729,074. Improved humidifiers of the self-cleaning atomizer type operable by both air and water under pressure have been developed, such as shown in patents to Simon No. 2,362,102 and Holtzclaw No. 2,384,679, such humidifiers being particularly suited to graduated control for varying the rate of output of moisture in accordance with variations in the humidity and temperature of the space to be humidified. To date, however, the use of these improved atomizers has been hindered because of the lack of development of suitable controlling means.

The present invention goes much further than heretofore by combining certain of the best features of previously developed atomizer humidifier systems including automatic control instruments and accessories with new improvements.

The principal object of the present invention is to even out the humidifying cycle by operating atomizing units of the general type shown in Patent No. 2,384,679 at all times under normal conditions such as prevail in a textile mill or other industrial establishment where controlled humidity is required, and continuously varying the moisture delivery of the units in correlation to the requirements for humidity of the atmosphere of the enclosure to produce a more clearly fixed level or close range of humidity in the enclosure, and only to interrupt the continuous supply of moisture when, with the output of the humidifiers reduced to the minimum for satisfactory and economical operation, the humidity of the enclosure begins to exceed the upper limit of said close range.

A further object of the invention is to provide improved control means for utilizing the variable output feature of atomizer humidifiers of the general type shown in the Simon and Holtzclaw patents above referred to, so that under normal operating conditions when maximum output of the humidifiers is not required, the humidifiers may be made automatically to operate at reduced output in such manner as to produce a finer atomization of the water and wider dissemination thereof within the enclosure than is secured when less improved control means are utilized.

A more specific object of the invention is to provide a system of the character described with the main regulating instrument of such extreme sensitivity and quick response to changes in atmospheric conditions within the enclosure that it will continuously adjust the supply of moisture in correlation thereto before any appreciable change in the condition of the humidity within the enclosure has occurred.

A further specific object of the invention is to provide a humidifying system having conduits for supplying air and water under the same or correlated pressures to the moisture supplying means with a main and a supplemental valve in the conduit which supplies air under pressure to the system, with automatic controlling means acting in response to a small deficiency of humidity of the atmosphere below a predetermined standard, first to open the main valve, thereby to permit control of the humidifiers by the supplemental valve at very low moisture output and thereafter, if the deficiency in humidity increases, gradually to increase the opening in the supplemental valve to cause gradual increase in humidifier output until humidity begins to rise, upon which the opening in the supplemental valve is gradually reduced and humidifier output is correspondingly lessened. In this way the output of the humidifiers may vary through a very wide cycle during a period of widely fluctuating requirements, always keeping the resulting range of variation in humidity of the atmosphere within narrow limits. Also by using the highly improved automatic humidity regulating instrument of the type described herein which is sensitive to minute fluctuations in humidity of the atmosphere to which it is exposed, the output of the humidifiers may be graduated so closely that under conditions of nearly constant moisture demand the humidifiers will continue to operate at fixed or nearly fixed output for long periods in sharp contrast to the on and off operation or the widely varying output of other systems less highly perfected.

These and other objects and features of the invention will more fully appear from the following description and the accompanying drawings and will be particularly pointed out in the claims.

An illustrative embodiment of the invention is shown in the accompanying drawings, in which, Fig. 1 is a diagrammatic view of a humidifier system embodying my invention;

Fig. 2 is a front view of an improved type of regulator for controlling the main and supplemental valves, the front door being omitted to show the wet and dry bulb thermosensitive elements and the valve mechanism operable thereby;

Fig. 2a is a horizontal sectional view on line 2a—2a Fig. 2;

Fig. 2b is a detail view of a modified connection between the lever which is actuated by the wet bulb element and the bar which controls the conjoint action of the wet and dry bulb elements;

Fig. 3 is a side elevation of the regulator illustrated in Fig. 2, showing the manner in which the moisture is supplied to the wet bulb element;

Fig. 4 is a vertical sectional view on line 4—4 Fig. 2, showing the dry bulb compartment, the thermosensitive element contained therein, the mechanism operated thereby being omitted, and illustrating the manner in which a separate current of air from the enclosure to be humidified is introduced therethrough at sufficiently high velocity so that actuation of the dry bulb element will be prompt and accurate; and, Fig. 5 is a diagrammatic view illustrating the mechanism for controlling the operations of the main and supplemental valves.

The system for vaporizing water within an enclosure with means for regulating the same, embodying the invention as shown conventionally in the drawings, includes a horizontal air line 1, which may be provided with suitable horizontal branches, suitably supported in the usual manner in the upper portion of the enclosure to be humidified. Usual means, such as an air compressor, not shown, is provided for supplying air under suitable superatmospheric pressure to the air line 1. Atomizers 2, preferably of the type disclosed in Patent No. 2,384,679, in which the atomizers are supplied with water and air under the same or correlated pressures, are mounted on the air line 1 at suitably spaced intervals throughout the enclosure. The air line 1 extends from the pressure-supplying means through control valves 13 and 14 to the atomizers 2 and also communicates with the upper end of a water tank or other suitable enclosed container 3. A water pipe 4 which leads from the tank below the water line thereof extends upwardly and thence horizontally in parallelism with the air line 1 and is provided with vertical pipes 5 leading to the several atomizers. Suitable means are provided for supplying water to the tank 3 under somewhat higher pressure than that of the air in order to permit the tank to be properly filled. As illustrated the pipe 6 from a suitable main or other source of supply delivers water under pressure through a water feeder 7 which is secured to the side of the tank 3 and communicates with the tank to maintain a predetermined water level therein. A float valve 8 within the chamber of the water feeder controls the entrance of water from the pipe 6. As a further protection in maintaining water level within desired limits, a supplemental float valve 9 mounted on extension 10 of feeder 7 may be provided to cause discharge of water from feeder chamber through waste pipe 11, in the event that the water level in the tank rises above a predetermined level.

In the preferred construction shown the water level in the tank 3 is some distance below the water pipe 4 which supplies water to the atomizers so that the water pressure at the atomizers is at least slightly lower than the pressure of the air which is supplied to the atomizers through the air pipe 1, thus insuring that only atomized water will issue from the atomizers and that no drip will occur upon shutting off of the air pressure. However, the tank or other enclosed water container may be located in any position to provide the same water pressure as that of the air line or a desired pressure correlated to that of the air line.

It is to be emphasized that the method and apparatus for controlling water level herein described are merely illustrative. As far as the invention is concerned, the point of importance is that water level be maintained substantially constant and at a level with reference to the outlet of the humidifiers which is suited in each particular installation to the type of humidifier used and other requirements peculiar to the case at hand.

An automatic humidity regulator 12, as shown in Fig. 2, controls the air supplied to the atomizers through two diaphragm valves 13 and 14 in the air line 1. The main valve 13 is operated by the regulator to full-on or full-off positions while the supplemental valve 14 is actuated by the regulator on a graduated basis.

As illustrated in Figs. 2, 3 and 4, the humidity regulator 12, which is an improvement over previous humidity regulators of the same general type as shown in Patent No. 1,819,987 to Hodge, includes separate compartments for wet and dry bulb elements and it will be seen that both wet and dry bulb compartments are shielded from each other and from the main frame of the instrument by the double wall construction with insulating space between.

The dry bulb compartment 16 is contained in a rectangular casing 17 insulated by the surrounding air through which is guided a sample current of air from the room or enclosure. A rectangular projection 18 of casing 17, which extends through the back 19 of the regulator, provides an entrance for the air into the casing, where it thoroughly surrounds the thermosensitive element 23, then passes downwardly and outwardly through the back 19 of the housing and then out through a downwardly extending L 20. The sample of air is induced from the enclosure through the dry bulb compartment by an air nozzle 21 in the L which is supplied with air under pressure from a suitable source which blows downward through the outlet 22 of the L, thereby causing a rapid flow of air through the compartment. Thus the velocity of air through this compartment may be easily suited to the requirements for accuracy and precision of regulation. The element 23 in the dry bulb compartment comprises a superimposed series of thermosensitive flat cells having walls peripherally united and partially filled with a highly volatile fluid. The cells are mounted in horizontal position in order that both the current of air and the liquid contents will contact with the largest possible area of the walls of the cells and therefore increase their sensitivity and speed their response to changes in temperature of the air to which they are exposed. The dry bulb element is mounted on an arm extending from one end of a horizontal bar 24 which is attached centrally to the back of the main regulator housing. This supporting bar, which also carries the web bulb element, and its extension 24a, which carries the mechanism above is made of invar steel or other material having a relatively low coefficient of thermal expansion in order that the operation of the device as far as possible will be affected only by the action of the thermosensitive elements.

A vertical rod 25, which is connected at its lower end to the center of the top of the dry bulb thermosensitive element supports at its upper end a weighted lever 26 which is pivotally mounted upon a bracket 27, secured to the integral upward extension 24a of the bar 24.

The wet bulb compartment consists of a similar insulated casing 29 through which is guided a separate and entirely independent current of air from the enclosure. This air enters from the top, the flow being induced by the action of a humidifier 34. The flow of air through the wet bulb compartment is sufficiently slow and the spray from the humidifier 34 is sufficiently fine so that the air becomes quickly saturated and cooled to the wet bulb temperature of the entering air.

The saturated and cooled air after passing over the wet bulb thermosensitive element leaves the regulator via elbow 33, which may have an additional turn downwardly or horizontally, before issuing therefrom. The wet bulb thermosensitive element 35, which may be similar in construction to the dry bulb element 23 above described, is mounted on an arm attached to the opposite end of bar 24 from that to which the dry bulb element supporting arm is attached.

In view of the fact that the humidifiers 2 are normally supplied with water at a temperature at or near the temperature of the air of the enclosure being humidified, the wet bulb temperature of the air of the enclosure undergoes little or no change as a direct result of humidification. This is in contrast with the rapid changes in dry bulb temperature of the enclosure which take place as the rate of humidification and its resulting cooling effect change. For this reason the wet bulb temperature remains relatively stable, being affected largely by the rather slow changes in total heat of the atmosphere of the enclosure as influenced by changing weather conditions, sun effects, heat from machinery and other sources and which affect dry bulb temperature to a much greater extent than wet bulb temperature. Consequently when the wet bulb compartment once becomes conditioned to the wet bulb temperature of the air of the enclosure, the wet bulb thermosensitive elements are subjected to relatively small and slow changes in temperature and may therefore be designed and positioned differently from those in the dry bulb compartment with equally good results. Thus the instrument shown contains only two wet bulb cells compared to five dry bulb cells, and the wet bulb cells are mounted in a vertical instead of a horizontal position.

The advantages of the improved and novel construction of the dry bulb side of the regulator herein described will thus be evident to anyone skilled in the science of psychrometry. The most important novel construction features may be summarized as:

a. Enclosed inner dry bulb compartment, insulated from the rest of the instrument by air space or otherwise.

b. Separate entrance for an independent current of air to the dry bulb compartment directly and immediately from the enclosure to be humidified.

c. Means such as air nozzle for introducing to the dry bulb compartment air from the enclosure at a sufficiently high and independently controlled rate to insure accuracy and sensitivity.

d. Frictionless poppet valve for controlling regulation air pressure.

It is obvious that details of the regulator construction may vary considerably from the embodiments shown without departing from the scope of the invention.

A vertical bracket 36, which is mounted upon the horizontal bar 24 has pivotally mounted upon its lower end a vertical lever 37 against the side of which the wet bulb element 35 upon expansion exerts pressure to the left as shown in Fig. 2. A spring member 38, which is mounted upon the upper part of the bracket 36, presses a pin 39 against the lever 37, thereby holding the lever 37 firmly against the wet bulb element eliminating play therebetween and serving to move the lever to the right when the wet bulb element contracts.

The upper end portion of the lever 37, as shown in Fig. 2, is provided with a series of suitably spaced holes and a slide 40 which is adjustably mounted upon the upper end of the rod 37 and is adapted to be secured thereto in any of the holes by means of a bolt and nut 41. Selective adjustment of the slide 40 may be used where the regulator is set to operate, for example, near relative humidities of 50, 60, 70, or 80%, as may be desired for the predetermined condition of the air in the enclosure, additional adjustment for precise humidity level being made at point 84 as hereinafter described.

The upper end of the slide 40 is pivotally secured to a horizontal rod 42 which extends over the dry bulb compartment and is pivoted at its opposite end to an upwardly extending arm of a bell crank lever 43 which is fulcrumed upon an upwardly projecting arm of the weighted lever 26. The horizontal arm 43a of the bell crank lever 43 is provided with a seat which cooperates with an air nozzle 44 extending upwardly from the weighted lever 26 which is supported by the vertical rod 25 extending upwardly from the dry bulb element. A suitable hole in the weighted lever 26 communicates with the nozzle 44 and with a flexible pipe of a pneumatic system to control the operation of the diaphragm valves 13 and 14 in the manner hereinafter described.

A modified form of connection between the upper end of the lever 37 and the rod 42 is shown in Fig. 2b, in which the upper end of the lever 37 is provided with a longitudinal slot and the slide with a bolt extending through the slot and adjustably clamped therein by a nut 41. Suitable markings along the side of the slot to indicate the position of the bolt for the predetermined condition of the air in the enclosure and which will enable more accurate centering than that of the series of bolt holes illustrated in Fig. 2.

The control valve mechanism 15 of the regulator which governs the operation of the main diaphragm valve 13 and supplemental valve 14 in the air line 1 comprises a horizontal L-shaped casting having a body 45 and upwardly extending arms 46 and 47 being mounted upon an upward extension of the back plate 19 of the housing, with snap valve mechanism which is mounted upon the upwardly extending arms 46 and 47 for opening and closing the main valve 13 in the air line 1 and means in the body 45 for restricting the pressure of the air in a pneumatic system for controlling the operation of the snap valve, and also for continuously controlling the operation of the supplemental valve 14, when the main valve 13 is open, to vary the operation of the moisture supplying means in correlation to the demand for moisture by the air of the enclosure to maintain therein a predetermined standard of humidity.

In the controller construction illustrated in Fig. 5, air under full pressure is supplied through a pipe 48 to a horizontal conduit 49 which extends lengthwise in the body 45 of the controller 15, thence through a vertical branch 49a in the arm 47 provided with a lower chamber 49b and a cylindrical upper chamber 49c. A tubular valve sleeve 49d, which is provided with an enlarged head 49e fitting a countersink in the chamber 49c, extends through the arm 47 and has an externally screw threaded end having thereon a nut 49f which engages the face of the arm 47 and in conjunction with the head 49e clamps the valve sleeve firmly in place. The head of the valve sleeve has an axial passage which terminates in a conoidal valve seat 50 for a snap actuated valve 51 having a valve stem 51a which is mounted loosely in a bearing member 51b in the valve sleeve and is provided at its end with a double cone 51c adapted to be engaged by snap actuating mechanism hereinafter described. The valve sleeve 49d is provided beyond the valve seat 50 with an annular recess 49g which surrounds the valve 51 and communicates with a pipe 52 leading to the diaphragm valve 13 so that when the snap valve 51 is withdrawn from its seat air under full pressure from the pipe 48 will cause the diaphragm valve 13 to open.

The base of the controller is provided with a conduit 53 which extends longitudinally thereof in parallelism with the conduit 49 from the lower chamber 49b and is provided with means for restricting the pressure of the air passing therethrough to the regulator nozzle 44, to the snap valve actuating mechanism and to the diaphragm valve, 14, all of which are controlled by the conjoint movements of the thermosensitive elements of the regulator.

The pressure-restricting means as illustrated in Fig. 5 comprises a rod 54 having an externally screw threaded head 54a which is mounted in a countersink in the lower chamber 49b and has a small axial bore having a removable wire 54b extending therethrough, the size of which wire may be varied by filing, or otherwise, to adjust the amount of restriction of the air passing through the axial bore in the rod 54 in accordance with fixed requirements of the particular installation.

A pipe 55, which communicates with the end of the conduit 53, is provided with a T-shaped fitting from which a pipe 56 leads to the supplemental diaphragm valve 14 in the air line 1 and also communicates with a pipe 57 which leads through the rear wall 19 of the regulator and communicates with a flexible pipe 58 leading to the nozzle 44 in the weighted arm 26 of the regulator which is actuated by the dry bulb element 23.

The cooperating seat on the horizontal arm 43a of the bell crank lever 43, which is actuated by the wet bulb element 35, cooperates in the usual manner with the nozzle 44 on the weighted lever 26 to regulate the air pressure in the pipes 58, 57 and 56, and thereby continuously to control the opening of valve 14 on a graduated basis.

The air under pressure thus restricted in the conduit 53 and thus controlled by the regulator is also employed to actuate the snap valve mechanism of the controller.

As shown in Fig. 5 a branch conduit 59 extends upwardly from the conduit 53 in the vertical arm of the controller which desirably extends across a suitable aperture in the upward extension of the back of the controller casing. The conduit 59 communicates with a chamber 60 of an internally screw threaded boss 60a which extends rearwardly therefrom. The cylindrical boss 60a is provided with an axially chambered cylindrical cap 61 which is connected to the boss 60a by a screw threaded connection.

An expansible bellows 62 having a circular head 63 provided with an integral hub 64 is mounted upon the upwardly extending arm 46 in axial alinement with the boss 60a by a tubular screw 65 which extends through the arm 46 and has an externally threaded end portion which engages internal threads of an axial bore through the hub 64 and has a head 65a which engages the base of the chamber 60 thereby clamping the hub 64 against the upwardly extending arm 46, and also providing a passage from the chamber 60 to the interior of the bellows. The bellows has at its opposite end a head 66 having a hub 67 extending into the bellows 62. A rod 68, which extends through and is of smaller diameter than the bore through the screw 65, has a screw threaded end which engages the hub 67 of the head of the bellows. A spiral spring 69 which surrounds the rod 68 and is interposed between the base of the chamber 60 and a nut 70 which is mounted on the other end of the rod and secured in adjusted position by a lock nut 71 serves to hold the bellows in predetermined collapsed position against the restricted air pressure which is supplied through the branch 59 of the conduit 53, the chamber 60 and the passage through the tubular bolt 65 to the chamber of the bellows 62.

The snap valve actuating mechanism comprises a cylindrical axially chambered member 72 having at one end an annular flange 73 which is provided with an axial screw threaded bore in which a screw 74 is seated which is provided with an enlarged head 75 having a central projection 75a which is seated in a complementary central recess in the hub 67 of the bellows 62 to provide an interlocking joint therebetween. A lock screw 76, which extends radially through the flange 73 and abuts against the screw 74, serves to lock the screw accurately in longitudinally adjusted position.

The cylindrical wall of the chamber in the member 72 is provided adjacent its free end with an internal annular recess 78 in which is mounted an annular contractible coiled spring 79 which surrounds and engages the conical end 80 of the double cone 51c which is mounted upon the end of the stem 51a of the snap valve 51. A spiral spring 81, which encircles the member 72, is interposed between the flange 73 on the chambered member 72 and a nut 84 which is mounted on the externally threaded extension of the clamping nut 49f holds the projection 75a of the screw 74 in interlocking engagement with the socket in the hub 67 of the bellows 62. The bellows 62 is forced into somewhat collapsed position by the tension of the spring 69 which surrounds the rod 68. The adjustment of the screw 74 and of the nut 70 on the rod 68 is such that the contractible spring 79 engaging the conical end 80 of the valve stem 51a will normally hold the valve 51 in engagement with its seat 50, thereby preventing the passage of air under full pressure from the pipe 48 through the conduit 49 and branch 49a and snap valve to the pipe 52 which leads to the main valve 13 in the air line 1.

When air under less restricted pressure is conducted from the conduit 53 through the branch conduit 59 and chamber 60 through the passage 65a in the tubular bolt 65 into the bellows 62, the chambered member 72 will be forced longitudinally until the annular spring 79 passes over the rim of the double cone 51c thereby withdrawing the snap valve from closed position and permitting air under full pressure to pass through the pipe 52 to the diaphragm valve 13 and force the latter to open position.

The restricted air pressure in the conduit 53 is controlled by the conjoint action of the thermosensitive members of the regulator which thus operates to vary the openings of valves 13 and 14 to control the moisture output of the atomizers.

Means for setting the regulators so to control the restricted air pressure as to provide a desired standard of humidity in the air of the enclosure comprises an adjusting screw 82 which is mounted in the wall 29 of the wet bulb compartment and engages at one end a disk 83 upon the outermost cell of the wet bulb thermosensitive member 35 and is provided at its opposite end with an angular head 84 adapted to be engaged by a suitable tool. A disk 85, which is fixedly attached to the adjusting screw 82 and which is located between the wall 29 of the wet bulb compartment and the casing of the regulator, is provided with a circular series of indicia such as 50, 60, 70 and 80, representing the different settings for desired standards of relative humidity of the atmosphere of the enclosure. These indicia are visible through a suitable hole 85*a* in the wall of the casing as illustrated in Figs. 2 and 3.

A suitable gauge 86, which communicates with the pipe 57, registers the restricted pressure of the air which controls the operation of the snap valve and the supplemental valve 14 in the main air line 1, while a similar air gauge 87, which communicates with the pipe 48 indicates the pressure of the air supplied to the regulator.

The regulator operates to control the main valve 13 and the supplemental valve 14 in the main air line 1 and thereby to vary the capacity of the atomizers as follows:

Assuming that the air in the enclosure is below the desired standard of humidity the atomizer 34 is turned on and saturates and projects a current of saturated air from the enclosure upon the thermosensitive element 35 in the wet bulb compartment of the regulator, thereby reducing the temperature thereof to the psychrometric wet bulb temperature. At the same time air under high pressure is supplied to the air nozzle 21 in the L of the dry bulb compartment, thereby inducing a current of air to flow from the enclosure through the dry bulb compartment of the regulator and to encompass the cells of the thermosensitive member 23 therein. As the temperature of the thermosensitive element 35 in the wet bulb compartment drops, the element contracts allowing lever 37 to move to the right, thus moving rod 42 to the right causing bell crank lever 43 to rotate clockwise, which brings seat on arm 43*a* into near contact with nozzle 44, thereby preventing the rapid escape of air through the nozzle and causing increase of the restricted pressure in the regulator system.

When the escape of air from the nozzle 44 is thus partially prevented the restricted pressure will build up to a predetermined minimum, say eight pounds, and air under such pressure will pass through the branch conduit 59 of the controller into the chamber 60 thereof and therefrom through the tubular screw 65 into the bellows 62, thereby expanding the bellows and forcing the chambered member 72 longitudinally until the coiled spring 79 slips from the conical end 80 of the double cone 51*c* over the rim of the double cone and will move the snap valve 51 to open position thereby permitting full pressure of the air from the pipe 48 and conduit 49 to pass through the pipe 52 and move the main diaphragm valve in the air line 1 to open position, thus letting air under full pressure to flow through the main air line 1 to the supplemental diaphragm valve 14. As the restricted pressure in the pipe 56 which leads to the supplemental diaphragm valve 14 is at the same minimum the diaphragm valve 14 will open only sufficiently to permit the atomizers to operate at a low capacity.

If the thermosensitive elements in the regulator act gradually to move the nozzle 44 into closer engagement with the valve seat upon the arm 43*a*, the restricted air pressure will gradually increase and the supplemental diaphragm valve 14 will be correspondingly opened, thereby increasing the pressure of the air delivered to the atomizer and the pressure upon the water delivered to the atmosphere and causing the atomizers to operate at progressively higher capacities.

When the humidity of the enclosure begins to rise toward the predetermined standard for which the regulator is set, the wet bulb temperature will remain virtually stationary and the dry bulb temperature will begin to drop causing the thermosensitive element 23 to contract and separate the nozzle and the seat on the arm 43*a* of the bell crank lever 43 to permit the air under restricted pressure to leak out and reduce the opening of the supplemental diaphragm valve 14 in the main air line 1. The regulator system will then continue in balance in accordance with the demand for humidity in the air of the enclosure, the restricted pressure increasing and decreasing as the nozzle 44 and seat on the lever arm 43*a* are actuated to gradually prevent or permit air to leak out, thus varying the amount of opening of the gradually acting supplemental diaphragm valve 14 in the main air line 1 leading to the atomizers. If the condition of the humidity of the air of the enclosure begins to exceed the predetermined standard of humidity the leakage of air through the nozzle 44 will reduce the pressure of the restricted air to such an extent that the spring 79 will be caused to slip over the rim of the double cone 51*c* onto the conical end 80 of the snap valve, thus causing the snap valve 51 to be seated and there by cutting off pressure in the pipe 52 which leads to the main diaphragm valve. The air under pressure in the pipe 52 is then exhausted through the space between valve stem 51*a* and its bearing 51*b* thus enabling the normally closed main diaphragm valve 13 to close and remain closed until the humidity of the air of the enclosure is slightly below the predetermined condition of humidity, whereupon the thermosensitive members in the wet and dry bulb compartments will again act in the manner aforesaid to partially close the valve seat upon the nozzle and again build up sufficient restricted air pressure to cause opening of the main valve 13 restoring operation of the supplemental valve 14 in the manner above described.

The improved type of wet and dry bulb humidity regulator described herein meets to an exceptional degree the requirements for accuracy and sensitivity in controlling the pressure of air to the main and supplemental valves on which the successful operation of the humidifying system herein described is dependent, and consequently is the preferred type of regulator for the purpose. Nevertheless, it is obvious that the gradual acting humidifying system of this invention does not necessarily require this particular type of humidity regulator. Any other instrument which would operate the main and supplemental valves with required precision and dependability could be used.

In controlling the humidity of an enclosure to maintain a predetermined degree of humidity by regulating the amount of moisture supplied to the air, as from atomizers under the control of a regulating mechanism, it is obvious that there may be a slight increase in humidity above the predetermined degree and a slight decrease below this degree under the action of the regulating mechanism.

In the present case, and assuming that the apparatus is properly adjusted and in operation, the control of the humidity usually will be exercised by the supplemental valve with the main valve wide open. This control will be the normal control, holding the humidity close to the predetermined degree. Under some circumstances, however, the demand for moisture to maintain a prescribed humidity condition in the enclosure may be very low. At such times if the humidity is increased so that the maximum point of the small range within which the regulator operates is reached, then the snap valve will close the main valve, after which the amount of opening in the supplemental valve will be immaterial. Under ordinary conditions the humidity will then fall, but as soon as the humidity has fallen only slightly below the maximum control point, the main valve will snap open. At this on and off point of the main valve, the supplemental valve will be slightly open. If the humidity continues to fall, indicating an increased and more nearly normal demand for moisture, then under these conditions the pressure on the supplemental valve will gradually build up and that valve will control the humidity. The total extent of the small humidity control range is adjustable by setting the operating points of the several valves and other parts of the regulation system, being dependent also upon the sensitivity of the elements in the regulator which are responsive to changes in the surrounding atmosphere.

Having thus described the invention, what is claimed as new, and desired to be secured by Letters Patent, is:

1. A humidifying system having means for vaporizing water and disseminating the vapor thereof in an enclosure with a conduit for supplying water to the vaporizing means, a conduit for supplying air under superatmospheric pressure to the vaporizing means, a main valve in said air conduit movable only to sudden fully closed and fully open positions, a supplemental valve in said air conduit movable gradually toward and from open position, a regulator in said enclosure having thermosensitive elements subject respectively to the wet and dry bulb temperatures of the air of the enclosure, and means operable by the conjoint action of said elements to cause actuation of the main valve to supply full air pressure to the supplemental valve, and to actuate the supplemental valve gradually to control the amount of moisture supplied to the enclosure by the vaporizing means in response to the demand for moisture by the air of the enclosure to maintain a predetermined standard of humidity therein.

2. A system for conditioning the humidity of the air of an enclosure including water atomizing means, a pipe supplying water under pressure thereto, a pipe supplying air under superatmospheric pressure to said atomizing means, a main valve in said air pipe movable only to sudden fully open and fully closed positions to control the operation of the system, a supplemental valve in said air pipe gradually movable toward and from open and closed positions to control said atomizing means, a regulator in said enclosure having a controller provided with a conduit supplied with air under superatmospheric pressure having a pipe leading therefrom to said main valve, a snap valve in said conduit, and a branch conduit having therein means for restricting the pressure of air passing therethrough, means controlled by said restricted air for actuating said snap valve, pipes leading from said branch conduit respectively to the supplemental valve and to a nozzle in the regulator, a seat in cooperative relation to said nozzle, thermosensitive elements in said regulator, means operable by the conjoint action of said elements to cause relative movement between said nozzle and its seat thereby to vary the restricted air pressure and to cause actuation of said snap valve to open position and gradually to actuate said supplemental valve in response to varying conditions of humidity in the air of the enclosure to maintain a substantially invariable predetermined condition of humidity in said enclosure.

3. A system for conditioning the air of an enclosure including water-atomizing means, means for supplying water thereto and means for supplying air under superatmospheric pressure thereto having a main valve movable only to sudden fully open or fully closed position to control the operation of said system and a supplemental gradually movable valve, a regulator in said enclosure having a controller provided with a valved conduit for air under superatmospheric pressure for controlling the main valve, and a branch conduit having a restriction therein for reducing the pressure of the air passing therethrough, separate wet and dry bulb compartments in said regulator, thermosensitive elements in the respective compartments, means for projecting a saturated current of air upon the element in the wet bulb compartment, means for causing a separate current of air to flow from the enclosure through the dry bulb compartment and to encompass the element therein, means for conducting the restricted air from said controller to a nozzle in said regulator, a seat for said nozzle, means operable by the conjoint action of said elements to move said nozzle and seat toward and from each other thereby to vary the pressure of the restricted air, and means operable by such variation to control the supplemental valve to maintain a predetermined standard of humidity in the enclosure.

4. A system for maintaining the air of an enclosure at a predetermined standard of humidity comprising a horizontal air line supplied with air under suitable pressure leading to an hermetically closed tank, means for supplying water to said tank, means for maintaining the water in said tank at a predetermined level, a pipe leading from said tank below said water level and extending parallel with said air line, a plurality of atomizers mounted on said air line at suitably spaced intervals having means communicating with said air line and having means communicating with said water pipe, a main valve and a supplemental valve in said air line in advance of said atomizers, a regulator in said enclosure having thermosensitive wet and dry bulb elements, means for projecting a saturated current of air upon said wet bulb element, means for causing an independent current of air from said enclosure to flow over said dry bulb element, and means operable by the conjoint action of said wet and dry bulb elements to open said main valve when the humidity of the air of the enclosure is in deficit of said predetermined standard of humidity and thereafter controllably to regulate the operation of the supplemental valve thereby to continuously vary the capacity of the atomizers in correlation to varying demands for humidity by the air of the enclosure accurately to maintain said predetermined standard.

5. A humidifying system having means for vaporizing water and disseminating the vapor thereof in an enclosure with a conduit for supplying water to the vaporizing means, a conduit for supplying air under superatmospheric pressure to the vaporizing means, a main valve in said air conduit movable only to sudden fully closed or fully open positions, a supplemental valve in said air conduit movable gradually toward and from open position, regulating means responsive to changes in humidity of the air of the enclosure, and means operated by said regulating means to cause actuation of the main valve to supply full air pressure to the supplemental valve and to actuate the supplemental valve gradually to control the amount of moisture supplied to the enclosure by the vaporizing means in response to the demand for moisture by the air of the enclosure to maintain a predetermined standard of humidity therein.

6. A system for conditioning the humidity of the air of an enclosure including water atomizing means, a pipe supplying water under pressure thereto, a pipe supplying air under superatmospheric pressure thereto, a main valve in said air pipe movable only to sudden fully open or fully closed positions to control the operation of the system, a supplemental valve in said air pipe gradually movable toward and from open and closed posiitons to control said atomizing means, a regulator in said enclosure having a controller provided with a conduit supplied with air under superatmospheric pressure having a pipe leading therefrom to said main valve, a snap valve in said conduit, and a branch conduit having therein means for restricting the pressure of air passing therethrough, means controlled by said restricted air for actuating said snap valve, pipes leading from said branch conduit respectively to the supplemental valve and to a nozzle in the regulator, a seat in cooperative relation to said nozzle, means in said regulator responsive to changes in humidity of the air of the enclosure and acting to cause relative movement between said nozzle and its seat thereby to vary the restricted air pressure and to cause actuation of said snap valve to open position and gradually to actuate said supplemental valve in response to varying conditions of humidity in the air of the enclosure to maintain a substantially predetermined condition of humidity in said enclosure.

7. A system for conditioning the air of an enclosure including water-atomizing means, means for supplying water thereto and means for supplying air under superatmospheric pressure thereto having a main valve movable suddenly to fully open or fully closed position to control the operation of said system and a supplemental gradually movable valve, a regulator in said enclosure having a controller provided with a valved conduit for air under superatmospheric pressure for controlling the main valve, and a branch conduit having a restriction therein for reducing the pressure of the air passing therethrough, means for conducting the restricted air from said controller to a nozzle in said regulator, a seat for said nozzle, means responsive to the humidity of the air of the enclosure to move said nozzle and seat toward and from each other thereby to vary the pressure of the restricted air, and means operable by such variation to control the supplemental valve to maintain a predetermined standard of humidity in the enclosure.

8. A system for maintaining the air of an enclosure at a predetermined standard of humidity comprising a horizontal air line supplied with air under suitable pressure leading to an hermetically closed tank, means for supplying water to said tank, means for maintaining the water in said tank at a predetermined level, a pipe leading from said tank below said water level and extending parallel with said air line, a plurality of atomizers mounted on said air line at suitably spaced intervals having means communicating with said air line and having means communicating with said water pipe, a main valve and a supplemental valve in said air line in advance of said atomizers, a regulator in said enclosure responsive to the humidity of the air of the enclosure to open said main valve when the humidity of the air of the enclosure is in deficit of said predetermined standard of humidity and thereafter controllably to regulate the operation of the supplemental valve thereby continuously to vary the capacity of the atomizers in correlation to varying demands for humidity by the air of the enclosure accurately to maintain said predetermined standard.

GROVER B. HOLTZCLAW.

REFERENCES CITED

The following references are of record in the file of this patent:

UNITED STATES PATENTS

| Number | Name | Date |
|---|---|---|
| 960,830 | Cramer et al. | June 7, 1910 |
| 1,231,570 | Cramer et al. | July 5, 1917 |
| 1,819,987 | Hodge | Aug. 18, 1931 |
| 2,292,830 | Gauger | Aug. 11, 1942 |